United States Patent
O'Byrne

(10) Patent No.: US 8,527,552 B2
(45) Date of Patent: Sep. 3, 2013

(54) DATABASE CONSISTENT SAMPLE DATA EXTRACTION

(75) Inventor: John O'Byrne, Santa Clara, CA (US)

(73) Assignee: Business Objects Software Limited, Dublin (IE)

( * ) Notice: Subject to any disclaimer, the term of this patent is extended or adjusted under 35 U.S.C. 154(b) by 0 days.

(21) Appl. No.: 13/177,593

(22) Filed: Jul. 7, 2011

(65) Prior Publication Data
US 2013/0013584 A1    Jan. 10, 2013

(51) Int. Cl.
*G06F 17/30*    (2006.01)

(52) U.S. Cl.
USPC ........................... 707/803; 707/714; 707/716

(58) Field of Classification Search
USPC ................................ 707/803–810, 714, 716
See application file for complete search history.

(56) References Cited

U.S. PATENT DOCUMENTS

| | | | |
|---|---|---|---|
| 6,484,181 B2* | 11/2002 | Attaluri et al. | 1/1 |
| 7,302,447 B2* | 11/2007 | Dettinger et al. | 707/714 |
| 7,337,176 B1* | 2/2008 | Cheedella et al. | 1/1 |
| 7,904,487 B2* | 3/2011 | Ghatare | 707/803 |
| 2004/0111410 A1* | 6/2004 | Burgoon et al. | 707/4 |
| 2005/0198074 A1* | 9/2005 | Khayter et al. | 707/104.1 |
| 2005/0283667 A1* | 12/2005 | Batten et al. | 714/25 |
| 2006/0253419 A1* | 11/2006 | Lin et al. | 707/1 |
| 2006/0259912 A1* | 11/2006 | Weinrich et al. | 719/315 |
| 2006/0265411 A1* | 11/2006 | Anonsen et al. | 707/100 |
| 2008/0275927 A1* | 11/2008 | Bangel et al. | 707/204 |
| 2009/0319588 A1* | 12/2009 | Gandhi et al. | 707/206 |
| 2012/0054147 A1* | 3/2012 | Goetz et al. | 707/602 |
| 2012/0084325 A1* | 4/2012 | Bansode et al. | 707/792 |

* cited by examiner

*Primary Examiner* — Debbie Le

(57) ABSTRACT

Various embodiments of systems and methods for database consistent sample data extraction are described herein. The technique uses production data as input and outputs sample data in the same relational schema while preserving the integrity of joins of the different tables in the schema. For a given relational schema, the master tables are found. Then a subset is created by placing selection criteria in a query defining how to sample the data for these master tables. Following the joins, the dependent tables are added to the query automatically.

14 Claims, 7 Drawing Sheets

DATABASE CONSISTENT SAMPLE DATA EXTRACTION

FIELD

The field relates to databases. More precisely, the field relates to sample data extraction from a database forming a sample database with consistent data.

BACKGROUND

Within an organization, which handles databases, there is often a development team, either internal or consultancy, that needs to write applications to process or edit the data of the databases or to extract data from the databases for some reports prepared by analysts using Business Intelligence (BI) tools.

During the development and testing phase of an application, the development team is not allowed to use the production database for several reasons. For example, the performance of the current production system may be affected by the development teams if complex queries are run on the system for development purposes and testing. The volume of data is very crucial too, because it can slow down the development time if a slow query is run frequently. The production database may contain sensible information that the developers should not be allowed to access. For all these reasons, the Database Administrator (DBA) has to generate a copy of the production database using an ETL (Extract-Transform-Load) tool and manually performs repetitive steps such as: creating schema of the source production database on the target database that will be given to consultants/developers and copying a small portion of the data of all the tables from the source to the target. For example, only the sales of the last year instead of the full database history may be extracted for testing purposes. This task is difficult and time consuming, because the DBA has to be sure that the data of the different tables is still consistent, which means joint tables would still return values. Anonymizing certain sensitive data like social security numbers, credit card numbers, etc. is also a must. All these steps take a lot of time and are performed manually.

SUMMARY

Various embodiments of systems and methods of database consistent sample data extraction are described herein. In one embodiment, the method includes receiving a selection of a source database system and receiving a selection of one or more tables from the source database system. The method also includes identifying one or more master tables from the one or more selected tables, the one or more master tables connected to one or more dependent tables. The method further includes receiving a selection of sample data extraction variant for extraction of sample data from the one or more master tables. The method also includes filtering the one or more dependent tables to keep valid joins between the sample data of the one or more master tables and the one or more dependent tables and generating a sample database from the sample data of the one or more master tables and the filtered dependent tables.

In other embodiments, the system includes at least one processor for executing program code and memory, a source database with one or more fact tables, and an input device to provide user selection of one or more selected tables from the fact tables. The system also includes an identifier module to identify one or more master tables from the one or more selected tables, the one or more master tables connected to one or more dependent tables and an extraction module to extract sample data from the one or more master tables. The system further includes a filtering module to filter the one or more dependent tables to keep valid joins between the sample data of the one or more master tables and the one or more dependent tables and a generating module to generate a sample database from the sample data of the one or more master tables and the filtered dependent tables.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for database consistent sample data extraction are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
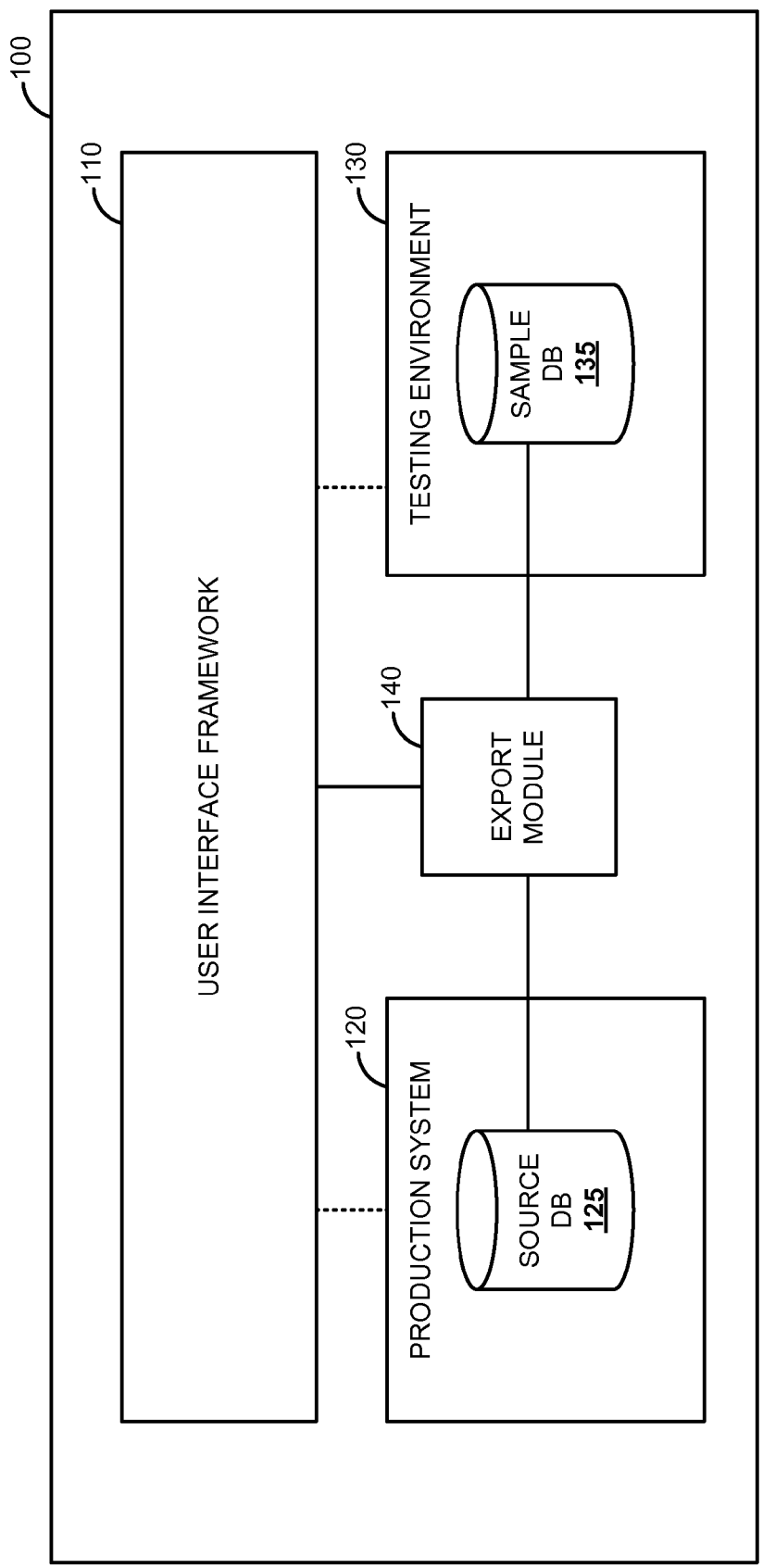
FIG. 1 is a block diagram representing an embodiment of a system of database consistent sample data extraction.

FIG. 1 represents a block diagram of an embodiment of a system 100 of database consistent sample data extraction. The system 100 includes a user interface framework 110. The user interface framework 110 is designed to mediate operations done on production system 120 and testing environment 130. The production system includes a source database (DB) 125. The source DB 125 comprises of data necessary for the performance of the production system 120. In some embodiments, the source DB 125 may be implemented as external to the system 100. The testing environment 130 is designed for developing and testing services. When a new computer application is being developed to run on the production system 120 and operate on data from the source DB 125, then during the development and testing process of this application, the testing environment 130 with its simplified sample DB 135 is to be used, so that the operation of the production system 120 is not affected. The transition of data from the source DB 125 to the sample DB 135 is done by export module 140. There are certain requirements for the data to be used as sample data within the sample DB 135. The process of transition is performed by receiving selections (queries) to the source DB, coming from the user interface framework 110 and an export module 140. After the initial selection is received, then the export module 140 is responsible for applying one or more processes, so that all related data to the already selected data from source DB 125 is transferred to the sample DB 135. Thus, the export module 140 ensures the transferred data to the sample DB 135 is consistent to the one it derived from—the source DB 125. The function of the export module 140 is to extract, transform and load the sample data to the sample DB 135 while preserving the consistency of the transferred data so that the sample DB 135 can serve as real prototype of the source DB 125 for development and testing purposes.

Figure 2:
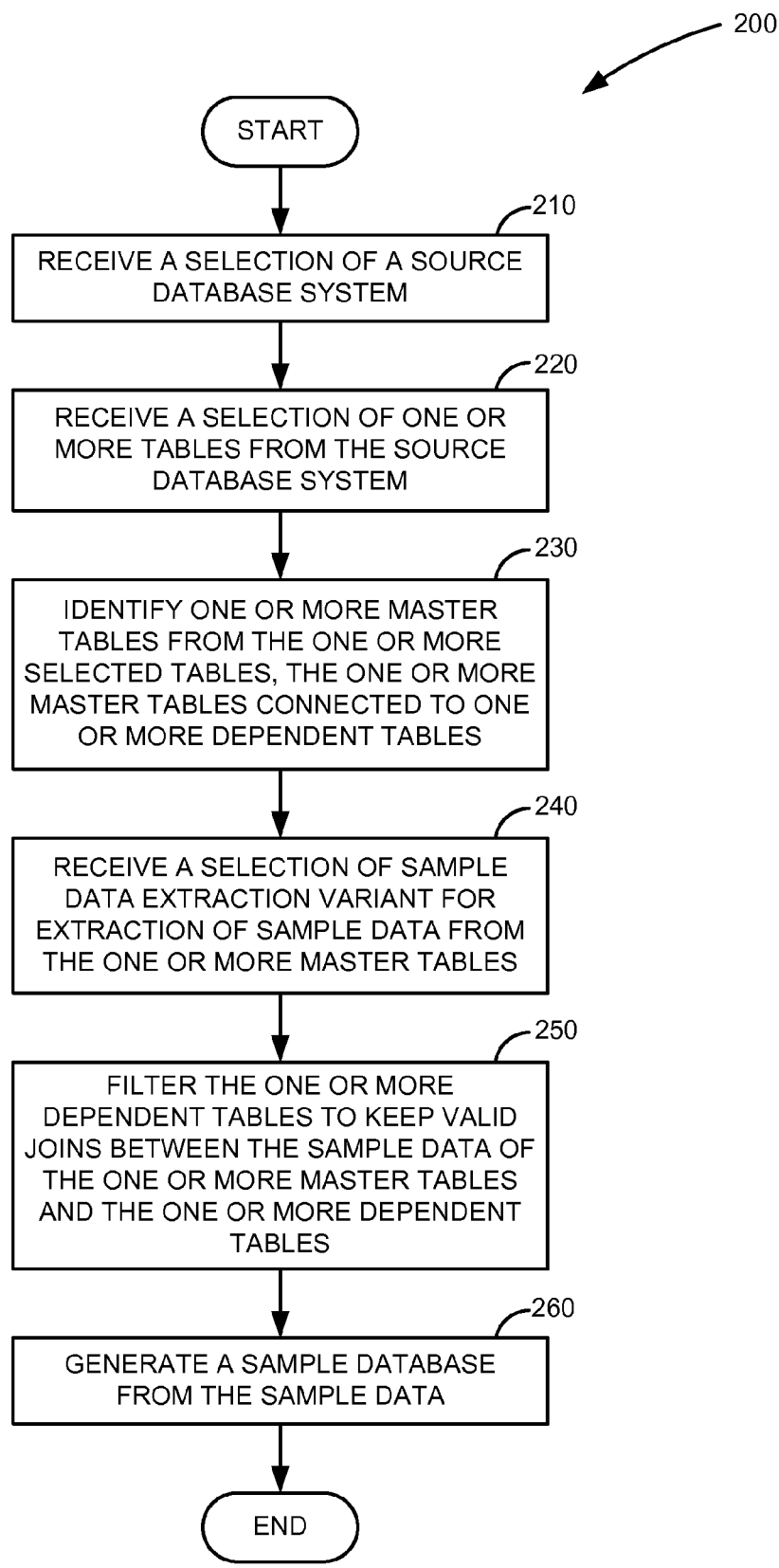
FIG. 2 is a flow diagram of an embodiment of a method of database consistent sample data extraction.

FIG. 2 is a flow diagram of an embodiment of a method 200 of database consistent sample data extraction. The method begins at block 210 with receiving a selection of a source database system. The source database system is used as a source for sample data extraction. The source database system may be implemented as the source DB 125. The selection may be executed by a user interface framework such as user interface framework 110. Further, at block 220, a selection of one or more tables from the source database system is received. According to one embodiment, the selection of one or more tables is done by querying the source database system selected in block 210. Querying the source database system may be performed through user interface framework, such as user interface framework 110.

Turning back to FIG. 2, at block 230, one or more master tables are identified from the one or more selected tables. The selected one or more master tables are connected to one or more dependent tables. In one embodiment, the identification of the master tables is performed by defining oriented cardinalities of the schema comprising the selected tables and their related tables. Then, paths are defined using the oriented cardinalities. The paths define the relations between the tables by following the joins between the tables. A master table detection algorithm and cardinalities detection algorithm are further presented in connection to FIG. 3, and FIG. 4.

Then, at block 240, a selection is received of a sample data extraction variant. In one embodiment, the sample data extraction variant is column value selection. In this case the data is queried by specific column value. In another embodiment, the sample data extraction variant is range of values selection. For example, the query is formed so that certain data falling within a range of values is selected. In yet another embodiment, random rows selection variant is selected. This means certain rows are selected randomly. The implementation of sample data extraction variant selection is performed in a wizard or another specifically designed tool within a user interface framework such as user interface framework 110.

Turning again to FIG. 2, at block 250, the one or more dependent tables are filtered, to keep valid joins between the sample data of the one or more master tables and the one or more dependent tables. Keeping valid joins means no related data is lost where the related data is identified by joins between tables of data. Thus, if some tables of data are selected for extraction, data from their related tables will also be extracted, so no data relation is lost and their joins are kept valid. This means joint tables would still return values if part of them is extracted for any purpose. In one embodiment, the filtration is implemented by following join cardinalities to reach the one or more dependent tables starting from the one or more master tables. An example of the filtration process is further explained in connection to FIG. 3 and FIG. 5.

Further, at block 260, a sample database is generated from the sample data of the one or more master tables and the filtered dependent tables.

In one embodiment, a selection of data is received to be obfuscated from the sample data of the one or more master tables and filtered dependent tables. This is used in order to ensure that security sensitive data is not present in the sample database created. The selection may be performed by user interface framework such as user interface framework 110.

In another embodiment, the obfuscation of data is performed automatically. In one embodiment, the automatic obfuscation includes obfuscating columns that have data corresponding to a pattern. A pattern can be expressed by a rule, set of examples, grammar, or the like. In one embodiment, the automatic obfuscation includes obfuscating specified columns.

Figure 3:
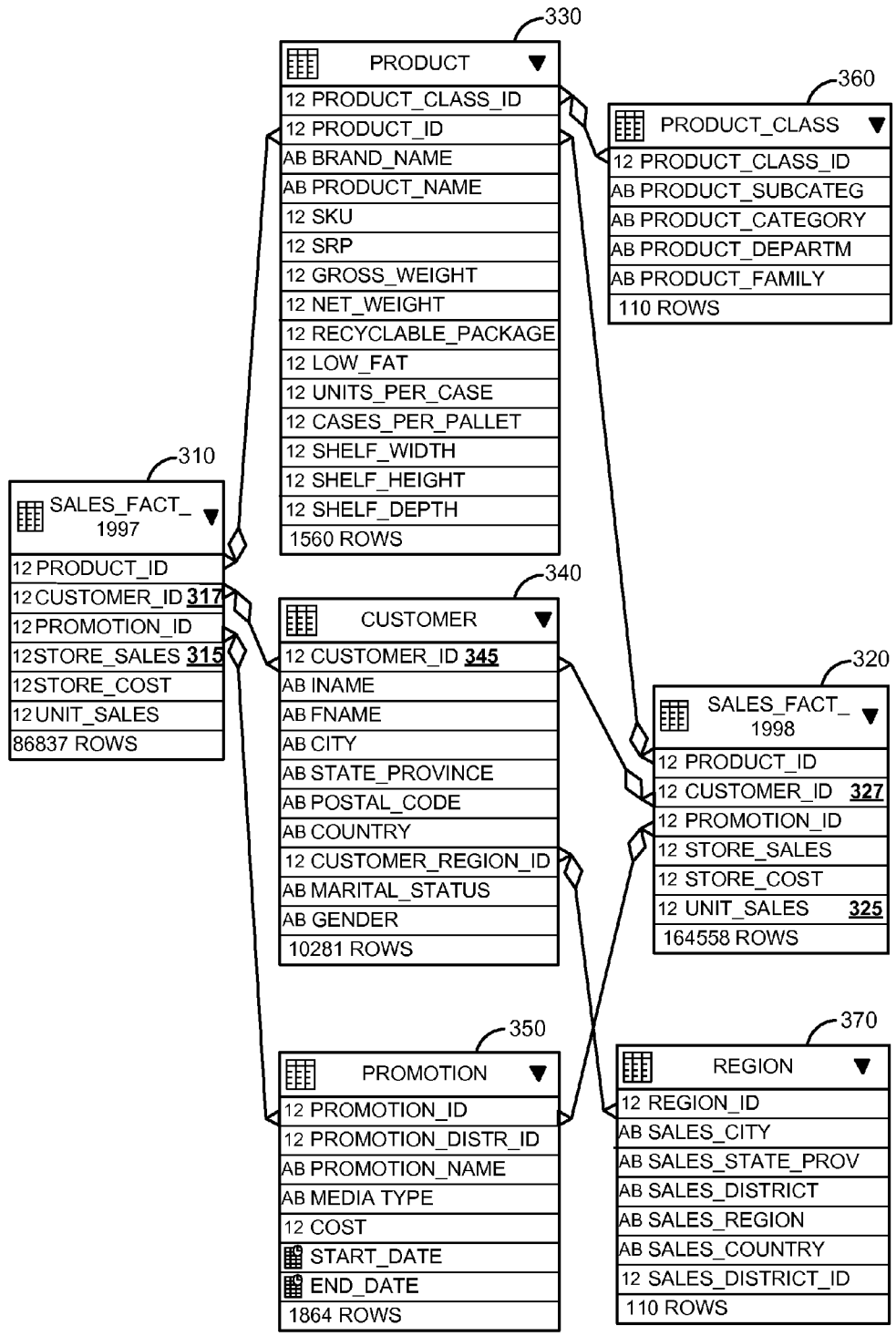
FIG. 3 illustrates an exemplary schema of tables with joins between the tables.
Figure 4:
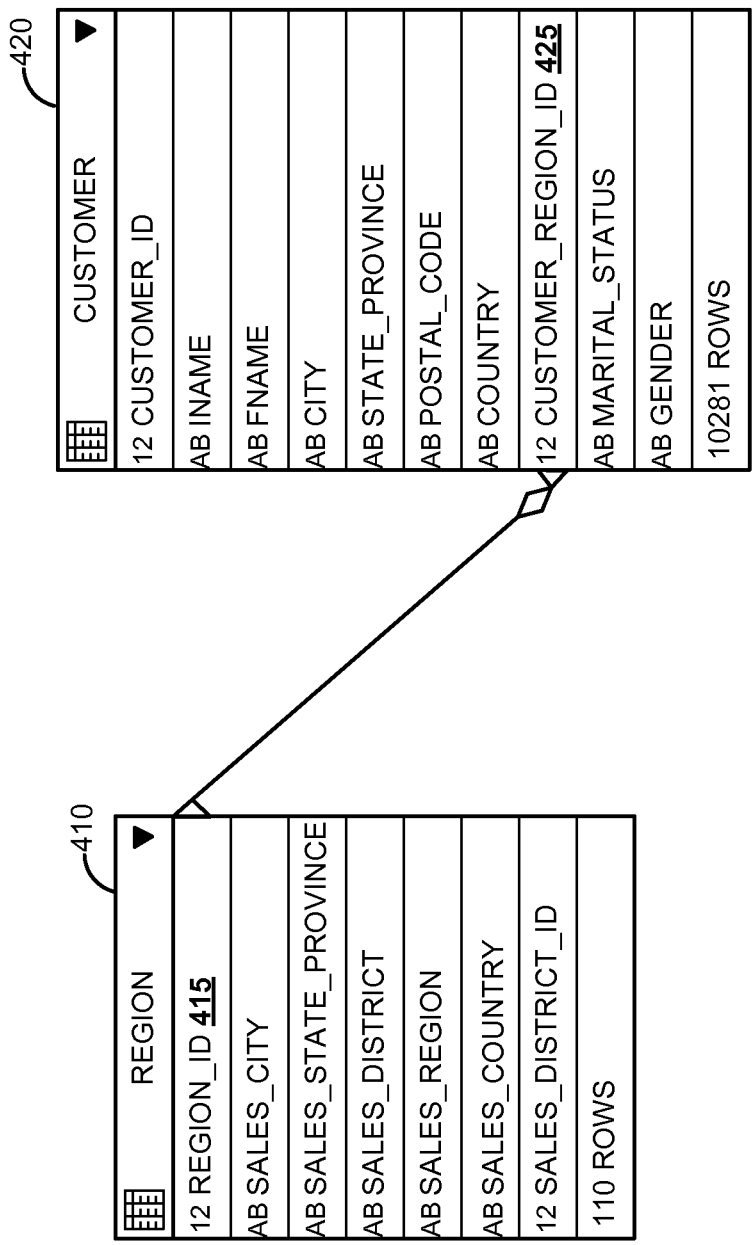
FIG. 4 illustrates an exemplary schema of tables with joins between the tables.

The schema presented in FIG. 3 is used for presenting an embodiment of master table detection algorithm. A table that has at least one many-to-one joins with another table and has no one-to-many relationships with any other table is a master table. In the schema presented in FIG. 3, the detected master tables are sales_fact_1997 table 310 and sales_fact_1998 table 320. The tables 310 and 320 have many-to-one relationship with other tables. Their dependent tables may be found by following the joins starting from those with cardinality one-to-many. For the sales_fact_1997 master table 310, the dependent tables are:

Promotion 350,

Customer 340→Region 370, and

Product 330→Product class 360.

For the sales_fact_1998 master table 320, the dependent tables are:

Promotion 350,

Customer 340→Region 370, and

Product 330→Product class 360.

When the master tables and their dependent tables are identified, there may be some other isolated tables, which are neither master tables, nor dependent tables (not shown). These tables have to be filtered manually.

In case two master tables have some dependent tables in common, the filter expression for those dependent tables will be an OR expression of the two filter expressions generated for each master table. For example, in FIG. 3, Customer 340 is a dependent table of both sales_fact_1997 master table 310 and sales_fact_1998 master table 320.

If the following expression is selected for sample data selection variant:

---
for sales_fact_1997 310: store_sales 315 > 1000, and for sales_fact_1998 320: unit_sales 325 > 3000,

--- then a filter expression is generated as:

---
(sales_fact_1997.store_sale 315 > 1000
AND
Sales_fact_1997.customer_id 317=customer.customer_id 345)
(sales_fact_1998.unit_sales 325 > 3000
AND
Sales_fact_1998.customer_id 327=customer.customer_id 345).

---

Following this approach no valid join is lost.

Cardinalities may be detected using two methods. In one embodiment, the cardinalities are detected by analyzing the primary and foreign keys of the tables if such primary and foreign keys are present. In another embodiment, the cardinalities are detected by row count of the tables by using 3 row count SQL statements and comparing the result of these counts. For the exemplary schema presented in FIG. 4, the cardinalities may be detected by using the following SQL statements and the results are put in variables C1, C2, and C12:

---
SELECT count(*) FROM region 410 -> C1
SELECT count(*) FROM customer 420 -> C2
SELECT count(*) FROM (SELECT * FROM region 410, customer 420 WHERE region.region_id 415=customer.customer_region_id 425) -> C12.

---

The following algorithm is then applied to detect the cardinality:

TABLE 1

---
if (C1 == 0)
    return Cardinality.CUNKNOWN;
if (C2 == 0)
    return Cardinality.CUNKNOWN;
if (C1 != C2 && C12 == C2)
    return Cardinality.C1_N;
if (C12 == C1 && C1 != C2)
    return Cardinality.CN_1;
if (C12 == C1 && C1 == C2)
    return Cardinality.C1_1;
if (C1 < C12 && C12 < C2)
    return Cardinality.C1_N;
if (C12 < C1 && C12 > C2)
    return Cardinality.CN_1;
if (C12 > C1 && C12 > C2)
    return Cardinality.CN_N;
return Cardinality.CUNKNOWN;

---

In this example presented above, since C1=110, C2=10281 and C12=10281, the detected cardinality is C1_N.

Figure 5:
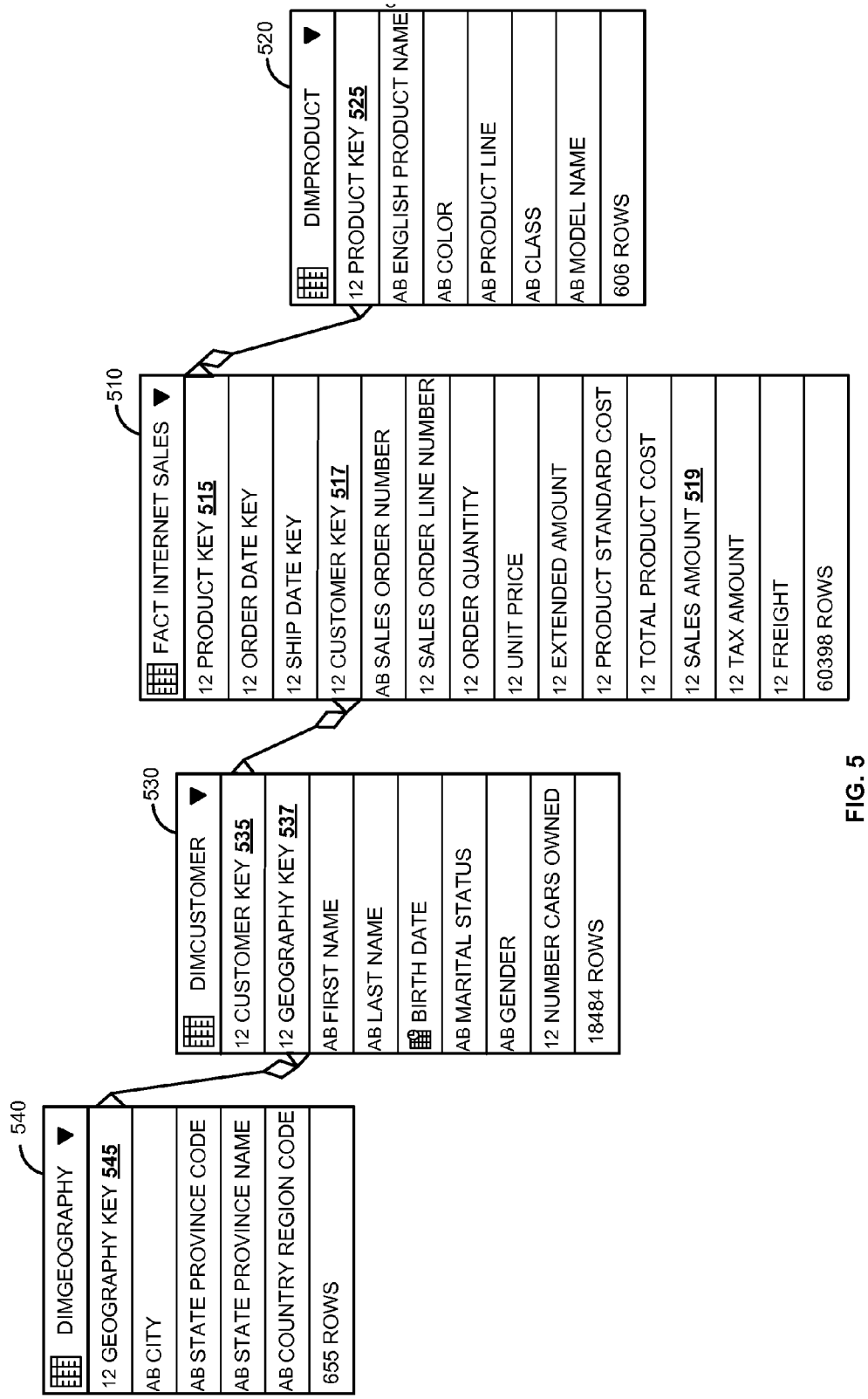
FIG. 5 illustrates an exemplary schema of tables with joins between the tables.

FIG. 5 represents FactInternetSales table 510 joined to two dimensions:

DimProduct 520 and DIMCustomer 530 with the following join expressions:

---
FactInternetSales.ProductKey 515=DimProduct.ProductKey 525
FactInternetSales.CustomerKey 517=DimCustomer.CustomerKey 535

---

The DimGeography table 540 is joined to the DimCustomer table 530 with the following expression:

DimCustomer.GeographyKey 537=DimGeography.GeographyKey 545

A workflow for filtering one or more dependent tables starts from a master table. For example, FactInternetSales table 510 is the master table we want to extract some sample data from. The selection of sample data from the master table FactInternetSales table 510 is done by the following expression:

FactInternetSales.SalesAmount 519>10000

To find out what filter to apply to all the other dependent tables, the cardinalities of the joins are followed to find the related tables, here DimCustomer 530 and DimProduct 520 and define the filter that will be applied by taking the first join expression and the filter of the master table.

For DimCustomer the filter is:

---
FactInternetSales.CustomerKey 517=DimCustomer.CustomerKey 535
AND
FactInternetSales.SalesAmount 519 > 10000

---

For DimProduct the filter is:

---
FactInternetSales.ProductKey 515=DimProduct.ProductKey 525
AND
FactInternetSales.SalesAmount 519 > 10000

---

Then following the join from DimCustomer 530 to DimGeography 540, its filter will include the join expressions to the FactInternetSales 510 and the FactInternetSales 510 filter expression:

---
DimCustomer.GeographyKey 537=DimGeography.GeographyKey 545
AND
FactInternetSales.CustomerKey 517=DimCustomer.CustomerKey 535
AND
FactInternetSales.SalesAmount 519 > 10000

---

These filter expressions can be used for creating sample data from the master table FactInternetSales 510. In one embodiment, an ETL replicates all these tables using the generated filter expressions.

Figure 6:
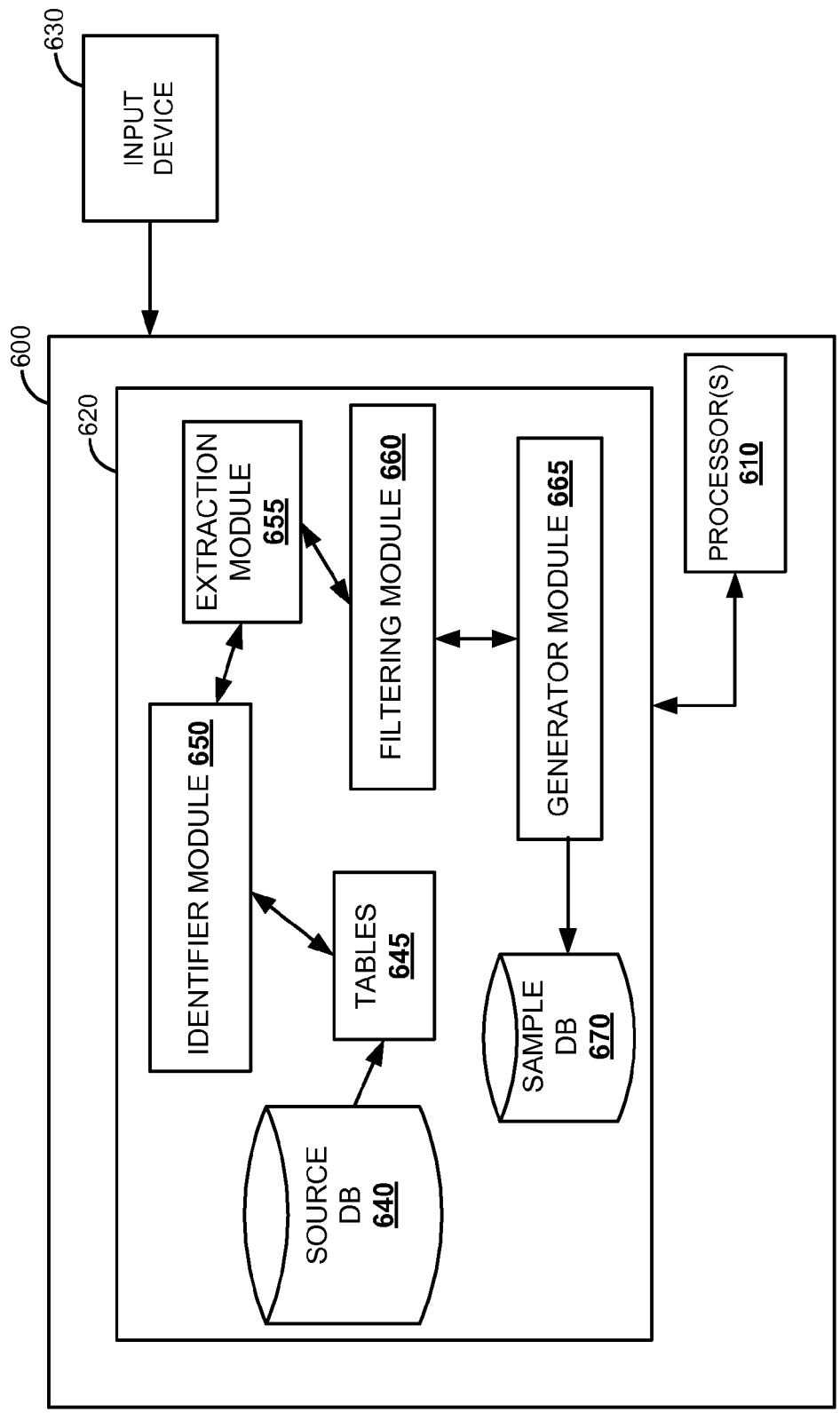
FIG. 6 is a block diagram of an embodiment of a system of database consistent sample data extraction.

FIG. 6 is a block diagram of an embodiment of a system 600 of database consistent sample data extraction. The system includes one or more processors 610 for executing program code. Computer memory 620 is in connection to the one or more processors 610. The system 600 further includes a source database 640 with one or more fact tables.

An input device 630 is connected to the system 600. In one embodiment, the input device 630 is a pointing input device used to provide user selection of one or more selected tables 645 from the fact tables of the source database 640. In yet another embodiment, the pointing input device is a mouse, a touch pad or a touch screen. In one embodiment, the input device is a text input device such as a keyboard or a touch screen display providing opportunity for typing.

The memory 620 also includes an identifier module 650 and an extraction module 655. The identifier module 650 is intended to identify one or more master tables from the one or more selected tables 645, the one or more master tables connected to one or more dependent tables. In one embodiment, the identifier module defines oriented cardinalities of tables from a schema comprising the selected tables 645 and their related tables and defines paths using the oriented cardinalities.

The extraction module 655 is intended to extract sample data from the one or more master tables. In one embodiment, the extraction module 655 uses sample data extraction variants (not shown) for extraction of sample data from the one or more master tables.

The system 600 further includes a filtering module 660 to filter the one or more dependent tables to keep valid joins between the sample data of the one or more master tables and the one or more dependent tables. In one embodiment, the filtering module 660 follows join cardinalities to reach the dependent tables starting from the master tables.

The system 600 also includes a generating module 665 to generate a sample database 670 from the sample data of the one or more master tables and the filtered dependent tables.

In one embodiment, the system 600 further includes an obfuscating module (not shown) to obfuscate sensitive data from the sample data of the one or more master tables and the one or more dependent tables. In one embodiment the obfuscating module identifies and obfuscates columns that have data corresponding to a pattern. A pattern can be expressed by a rule, set of examples, grammar, or the like.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
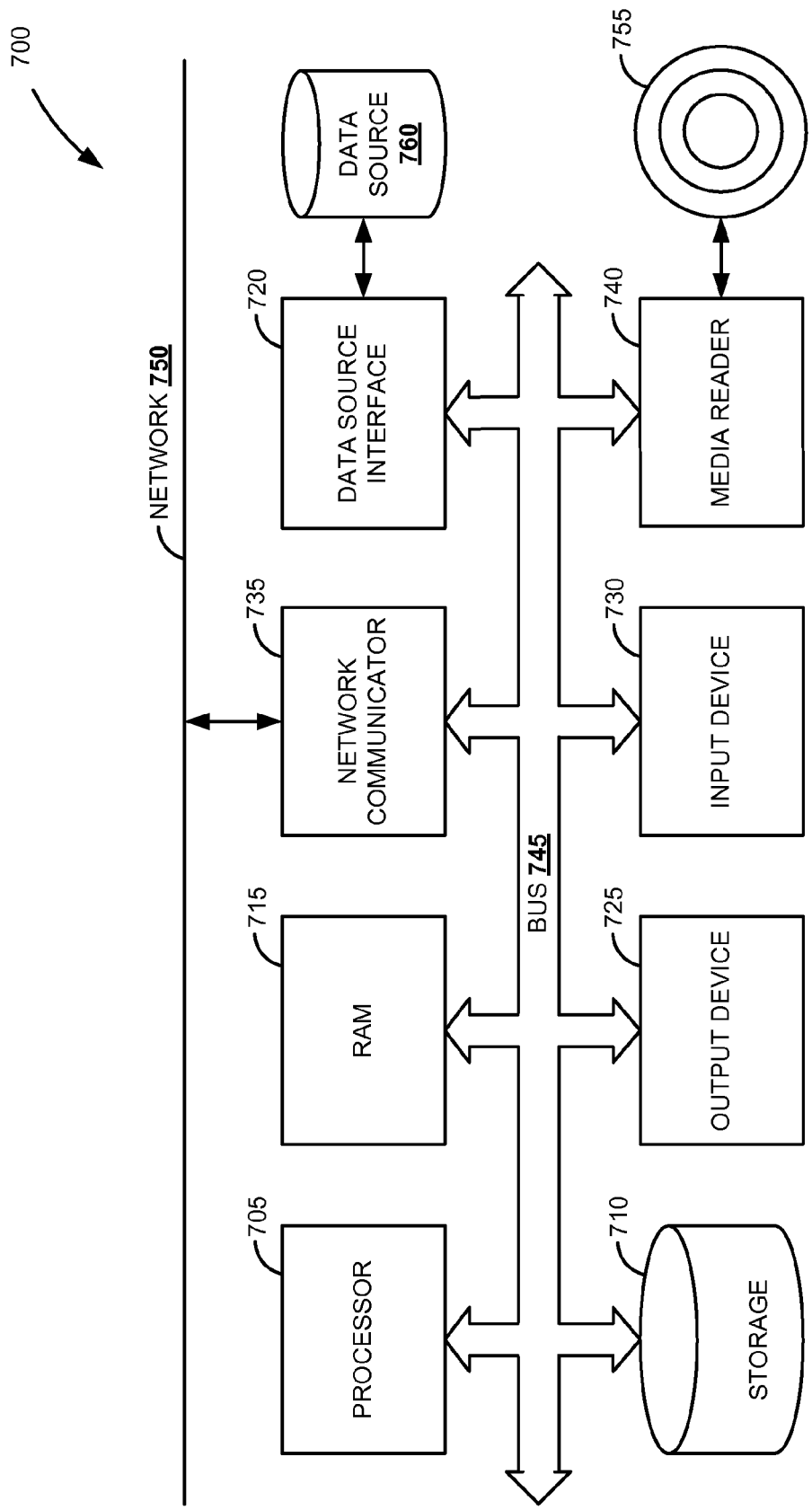
FIG. 7 is a block diagram illustrating a computing environment in which the techniques described for database consistent sample data extraction can be implemented, according to an embodiment of the invention.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for database consistent sample data extraction comprising:
   receiving a selection of a source database system;
   receiving a selection of one or more tables from the source database system;
   identifying one or more master tables from the one or more selected tables, the one or more master tables connected to one or more dependent tables by:
      defining oriented cardinalities of tables from a schema comprising the selected tables and their related tables; and
      defining paths using the oriented cardinalities;
   receiving a selection of sample data extraction variant for extraction of sample data from the one or more master tables;
   filtering the one or more dependent tables to keep valid joins between the sample data of the one or more master tables and the one or more dependent tables by following join cardinalities to reach the one or more dependent tables starting from the one or more master tables; and
   generating a sample database from the sample data of the one or more master tables and the filtered dependent tables.

2. The method of claim 1, wherein the sample data extraction variant for extraction of sample data from the master tables is selected from the group consisting of column value selection, range of values selection, and random rows selection.

3. The method of claim 1, further comprising receiving a selection of sensitive data to be obfuscated from the sample data of the one or more master tables and the one or more dependent tables.

4. The method of claim 1, further comprising obfuscating sensitive data from the sample data of the one or more master tables and the one or more dependent tables.

5. The method of claim 4, further comprising:
   identifying column contents of the sample data; and
   obfuscating columns of data from the sample data identified to fall within a predefined set of sensitive data.

6. A computer system for data visualization and interaction including at least one processor for executing program code and memory, the system comprising:
   a source database with one or more fact tables;
   an input device to provide user selection of one or more selected tables from the fact tables;
   an identifier module to identify one or more master tables from the one or more selected tables, the one or more master tables connected to one or more dependent tables by:
      defining oriented cardinalities of tables from a schema comprising the selected tables and their related tables; and
      defining paths using the oriented cardinalities;
   an extraction module to extract sample data from the one or more master tables;
   a filtering module to filter the one or more dependent tables to keep valid joins between the sample data of the one or more master tables and the one or more dependent tables by following join cardinalities to reach the one or more dependent tables starting from the one or more master tables; and
   a generating module to generate a sample database from the sample data of the one or more master tables and the filtered dependent tables.

7. The method of claim 6, wherein the extraction module uses sample data extraction variants for extraction of sample data from the one or more master tables.

8. The system of claim 6, further comprising an obfuscating module to obfuscate sensitive data from the sample data of the one or more master tables and the one or more dependent tables.

9. The system of claim 8, wherein the obfuscating module is operable to:
   identify column contents of the sample data; and
   obfuscate columns of data from the sample data identified to fall within a predefined set of sensitive data.

10. An article of manufacture including a non-transitory computer readable storage medium to tangibly store instructions, which when executed by a computer, cause the computer to:
   receive a selection of a source database system;
   receive a selection of one or more tables from the source database system;
   identify one or more master tables from the one or more selected tables, the one or more master tables connected to one or more dependent tables by:
      defining oriented cardinalities of tables from a schema comprising the selected tables and their related tables; and
      defining paths using the oriented cardinalities;
   receive a selection of sample data extraction variant for extraction of sample data from the one or more master tables;
   filter the one or more dependent tables to keep valid joins between the sample data of the one or more master tables and the one or more dependent tables by following join cardinalities to reach the one or more dependent tables starting from the one or more master tables; and generate a sample database from the sample data of the one or more master tables and the filtered dependent tables.

11. The article of manufacture of claim 10, further comprising instructions, which when executed by a computer, cause the computer to receive a selection of sample data extraction variant, wherein the sample data extraction variant is selected from the group consisting of column value selection, range of values selection, and random rows selection.

12. The article of manufacture of claim 10, further comprising instructions, which when executed by a computer, cause the computer to receive a selection of sensitive data to be obfuscated from the sample data of the one or more master tables and the one or more dependent tables.

13. The article of manufacture of claim 10, further comprising instructions, which when executed by a computer, cause the computer to obfuscate sensitive data from the sample data of the one or more master tables and the one or more dependent tables.

14. The article of manufacture of claim 13, further comprising instructions, which when executed by a computer, cause the computer to:

identify column contents of the of sample data; and
obfuscate columns of data from the sample data identified to fall within a predefined set of sensitive data.

* * * * *